United States Patent
Yamada et al.

(10) Patent No.: US 8,725,332 B2
(45) Date of Patent: May 13, 2014

(54) HYBRID VEHICLE

(75) Inventors: Kazunao Yamada, Toyota (JP); Takashi Naito, Okazaki (JP); Toshiaki Niwa, Okazaki (JP); Masatoshi Takahara, Okazaki (JP); Fumiharu Ogawa, Okazaki (JP); Hideaki Suganuma, Yokohama (JP); Mamoru Kuraishi, Ome (JP)

(73) Assignees: DENSO CORPORATION, Kariya (JP); Aisin AW Co., Ltd., Anjo (JP)

( * ) Notice: Subject to any disclaimer, the term of this patent is extended or adjusted under 35 U.S.C. 154(b) by 143 days.

(21) Appl. No.: 13/262,424

(22) PCT Filed: Mar. 31, 2010

(86) PCT No.: PCT/JP2010/002353
§ 371 (c)(1),
(2), (4) Date: Sep. 30, 2011

(87) PCT Pub. No.: WO2010/113496
PCT Pub. Date: Oct. 7, 2010

(65) Prior Publication Data
US 2012/0041629 A1    Feb. 16, 2012

(30) Foreign Application Priority Data

Mar. 31, 2009   (JP) ................................. 2009-085631

(51) Int. Cl.
*B60W 10/26* (2006.01)
*B60W 10/08* (2006.01)
*B60W 20/00* (2006.01)
*B60K 6/48* (2007.10)

(52) U.S. Cl.
USPC ................. 701/22; 180/65.8; 180/65.285

(58) Field of Classification Search
None
See application file for complete search history.

(56) References Cited

U.S. PATENT DOCUMENTS 5,778,326 A * 7/1998 Moroto et al. .................. 701/22
6,507,127 B1 * 1/2003 Amano et al. .............. 290/40 C (Continued)

FOREIGN PATENT DOCUMENTS

JP  A-2001-169408  6/2001
JP  A-2003-235106  8/2003

(Continued)

OTHER PUBLICATIONS

Office Action mailed on Aug. 7, 2012 issued in corresponding JP application No. 2009-085631 (and English translation).

(Continued)

*Primary Examiner* — Michael J Zanelli
(74) *Attorney, Agent, or Firm* — Posz Law Group, PLC (57) ABSTRACT

A hybrid vehicle includes a regenerative charging area detection section, a recovery loss estimation section, and a motor use ratio increase section. The regenerative charging area detection section detects arrival of a regenerative charging possible area in which a regenerative charging from a motor to a battery is possible. The recovery loss estimation section estimates a recovery loss of the regenerative charging based on a regenerative charge amount in the regenerative charging possible area and a current remaining battery amount in response to detection by the regenerative charging area detection section. In response to estimation by the recovery loss estimation section, before the arrival at the regenerative charging possible area, the motor use ratio increase section increases a use ratio of the motor so as to decrease a remaining battery amount while limiting the temperature of the battery to a predetermined temperature range.

4 Claims, 6 Drawing Sheets

(56) References Cited

U.S. PATENT DOCUMENTS

| | | | |
|---|---|---|---|
| 2002/0069000 A1* | 6/2002 | Nakao | 701/22 |
| 2008/0183348 A1 | 7/2008 | Arita et al. | |
| 2008/0262668 A1* | 10/2008 | Yamada | 701/22 |

FOREIGN PATENT DOCUMENTS

| | | |
|---|---|---|
| JP | A-2004-032904 | 1/2004 |
| JP | A-2004-324613 | 11/2004 |
| JP | A-2005-261034 | 9/2005 |
| JP | A-2006-306231 | 11/2006 |
| JP | A-2007-50888 | 3/2007 |
| JP | A-2007-126145 | 5/2007 |
| JP | A-2008-024306 | 2/2008 |

OTHER PUBLICATIONS

International Search Report mailed on May 11, 2010 for the corresponding International patent application No. PCT/JP2010/002353 (and English translation).

Written Opinion mailed on Nov. 5, 2010 for the corresponding International patent application No. PCT/JP2010/002353 (and English translation).

Office Action mailed Nov. 20, 2012 in corresponding JP Application No. 2009-085631 (and English translation).

Office Action mailed Aug. 5, 2013 in the corresponding CN Application No. 201080014648.4 (English Translation Included).

Office Action dated Feb. 17, 2014 issued in corresponding DE Patent Application No. 11 2010 001 450.7 (and English Translation).

* cited by examiner

HYBRID VEHICLE

CROSS REFERENCE TO RELATED APPLICATIONS

This application is a U.S. national stage of PCT/JP2010/002353 filed on Mar. 31, 2010, and is based on Japanese Patent Application No. 2009-85631 filed on Mar. 31, 2009, the disclosure of which is incorporated herein by reference.

TECHNICAL FIELD

The present invention relates to a hybrid vehicle.

BACKGROUND

Conventionally, hybrid vehicles that are switchable between running using a motor for driving (so called EV running) and running using the motor and an engine for driving (so called HEV running) are known. In the above-described hybrid vehicle, a technique for previously planning a switching between the EV running and the HEV running based on a route information and gradient information of a navigation system is known.

The switching control of the EV running and the HEV running is disclosed, for example, in the following patent document 1. The patent document discloses a hybrid vehicle that is switchable between the EV running and the HEV running. The hybrid vehicle includes an external battery charger that charges a battery with an external power source, a map information device that can identify a present location of a vehicle on map data, base registration means that registers a location where the external power source is installed as a base on the map data of the map information device, EV running area registration means that registers area where the EV running is possible centering around the base on the map data of the map information device, outward trip EV running means that executes the EV running in the EV running possible area when the hybrid vehicle starts from the base in a state that the external battery charger charges the battery with the external power source.

Figure 5A:
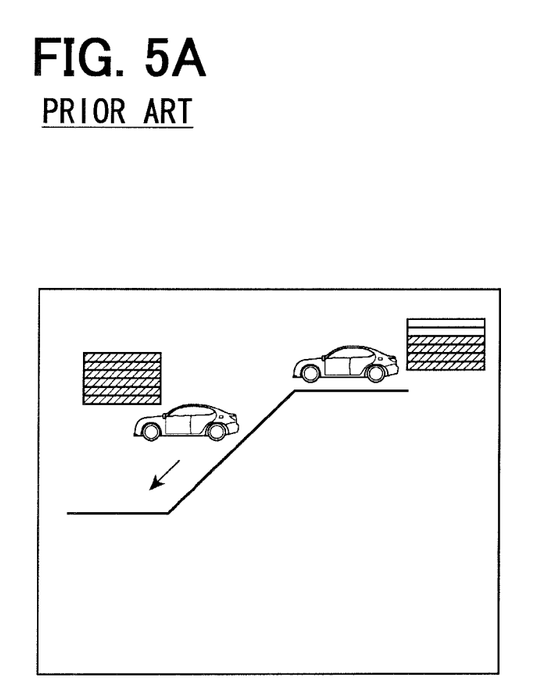
FIG. 5A and FIG. 5B are diagrams showing changes in a battery charge amount when a vehicle according to a conventional art goes downhill.

In the hybrid vehicle, a center value of battery charge amount (SOC) is fixed. Thus, when the hybrid vehicle goes downhill and a battery charging progresses, as shown in FIG. 5A, the battery charge amount reaches a charge limit (SOXmax: a state where electricity cannot be recovered (charged) any more) during going downhill. As a result, a recovery loss of a regenerative charging occurs.

Figure 5B:
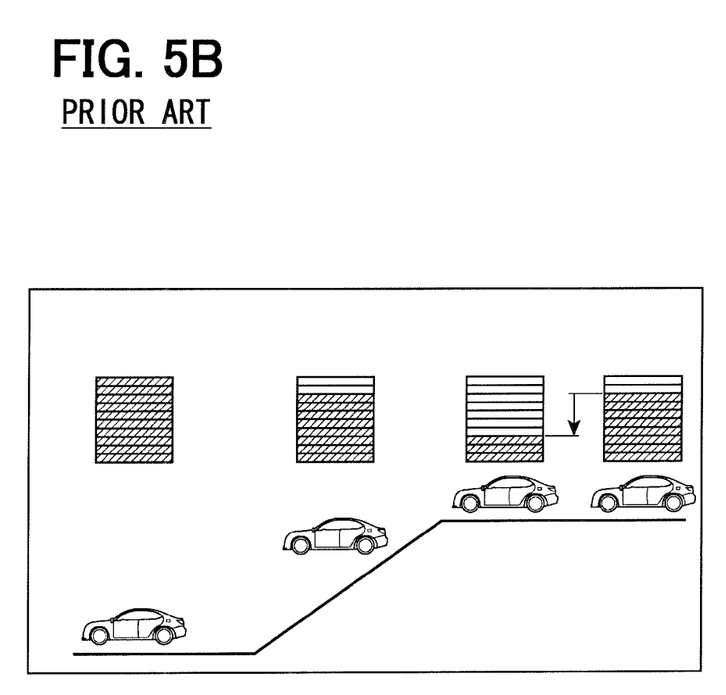

Thus, as shown in FIG. 5B, a study of a technique for recovering regenerative energy without loss during going downhill by previously switching to the EV running on a flat load before downhill running and reducing the battery charge amount has been conducted.

Figure 6:
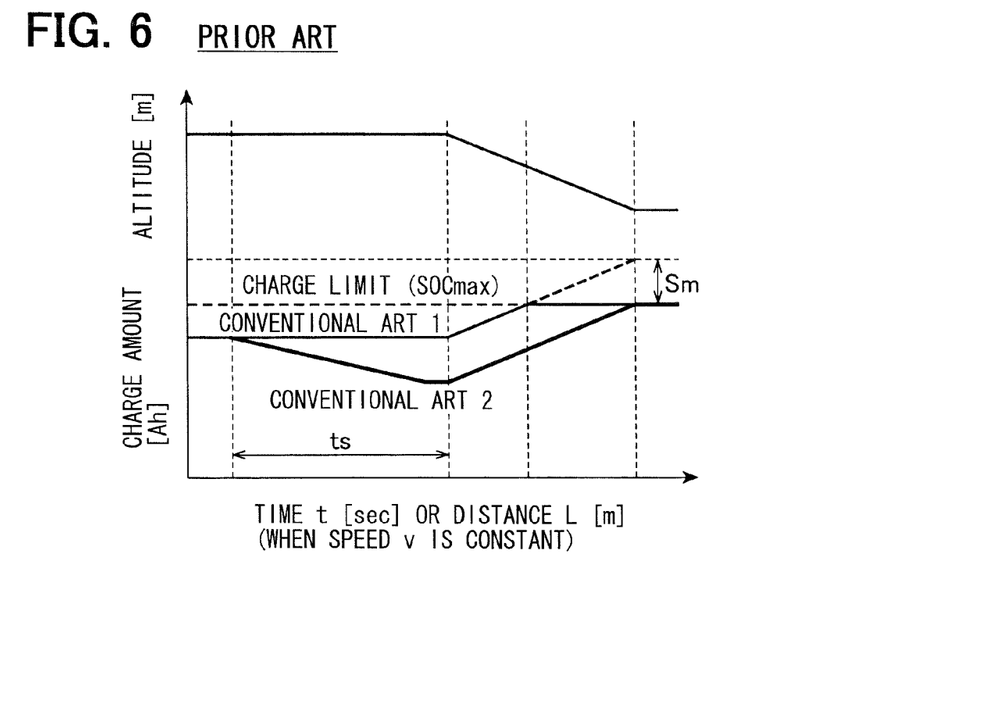
FIG. 6 is a graph showing a change in a battery charge amount when the vehicle according to the conventional art goes downhill.

As a result, as shown in FIG. 6, in a case where the battery charge amount is not reduced before going downhill (a conventional art 1 in FIG. 6), a recovery loss Sm of regenerative charging occurs. However, in a case where the battery charge amount is reduced before is (sec) of the downhill running in prospect of the recovery loss Sm of the regenerative charging (a conventional art 2 in FIG. 6), the regenerative charging is performed throughout the downhill running.

Figure 7:
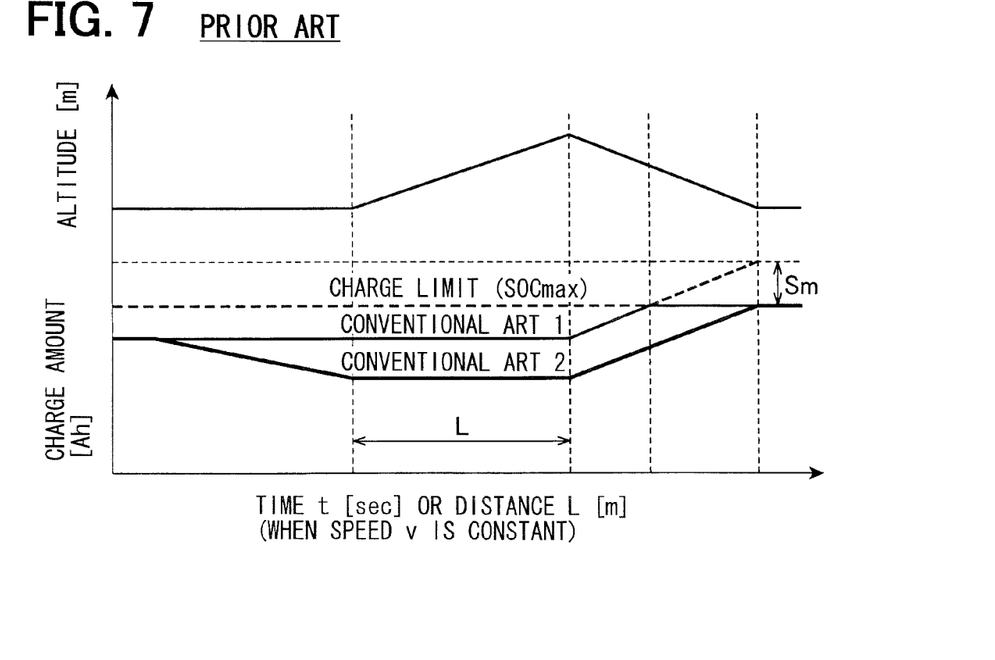
FIG. 7 is a graph showing a change in a battery charge amount when the vehicle according to the conventional art goes downhill.

In a case where there is an uphill in front of a downhill as shown in FIG. 7, if the EV running is performed on the uphill for reducing the battery charge amount, a feeling of strangeness in running may be caused. Thus, in this case, it is preferable to consume a sufficient battery charge amount at least until the hybrid vehicle reaches the uphill (that is, a distance L short of the uphill).

However, the present inventors found that even when the hybrid vehicle switches to the EV running before the downhill, a recovery loss of the regenerative charging may occur. Namely, in a battery, such as a nickel hydride battery, used for a hybrid vehicle, a limit temperature is set for securing reliability. A temperature of the battery is monitored with a temperature sensor, and when the battery exceeds the limit temperature, safety function works and charge and discharge is stopped forcibly. As a result, charging is not performed even during the downhill running that is a running condition in which a regenerative charging is possible, and a recovery loss of the regenerative charging occurs.

PRIOR ART DOCUMENT

Patent Document

Patent document No. 1: JP-A-2007-50888

SUMMARY OF INVENTION

In view of the above-described problem, it is an object of the present disclosure to provide a hybrid vehicle that can restrict a recovery loss of a regenerative charging.

A hybrid vehicle according to a first aspect of the present invention includes a battery temperature estimation section that estimates a temperature of a battery in accordance with a road condition to a destination, and a control section that sets use ratios of a motor and an engine in accordance with the temperature of the battery.

The hybrid vehicle can restrict a recovery loss of a regenerative charging with restricting an increase in the temperature of the battery.

A hybrid vehicle according to a second aspect of the present invention includes a regenerative charging area detection section, a recovery loss estimation section, and a motor use ratio increase section. The regenerative charging area detection section detects arrival of a regenerative charging possible area in which a regenerative charging from a motor to a battery is possible. The recovery loss estimation section estimates a recovery loss of the regenerative charging based on a regenerative charging amount in the regenerative charging possible area and a current remaining battery amount in response to detection by the regenerative charging area detection section. The motor use ratio increase section increases a use ratio of the motor so as to decrease a remaining battery amount while limiting the temperature of the battery to a predetermined temperature range before the arrival at the regenerative charging possible area in response to the estimation by the recovery loss estimation section.

The hybrid vehicle restricts a situation that the temperature of the battery exceeds the predetermined temperature. Thus, a situation that the battery cannot be charged after the temperature of the battery exceeds the predetermined temperature can be restricted, and a recovery loss of the regenerative charging in the regenerative charging possible area can be restricted. As a result, fuel consumption can be improved.

BRIEF DESCRIPTION OF THE DRAWINGS

The above and other aspects, features and advantages of the present invention will become more apparent from the following detailed description made with reference to the accompanying drawings. In the drawings.

DESCRIPTION OF EMBODIMENTS

Embodiments for achieving the present invention will be described with reference to the accompanying drawings.

Figure 1:
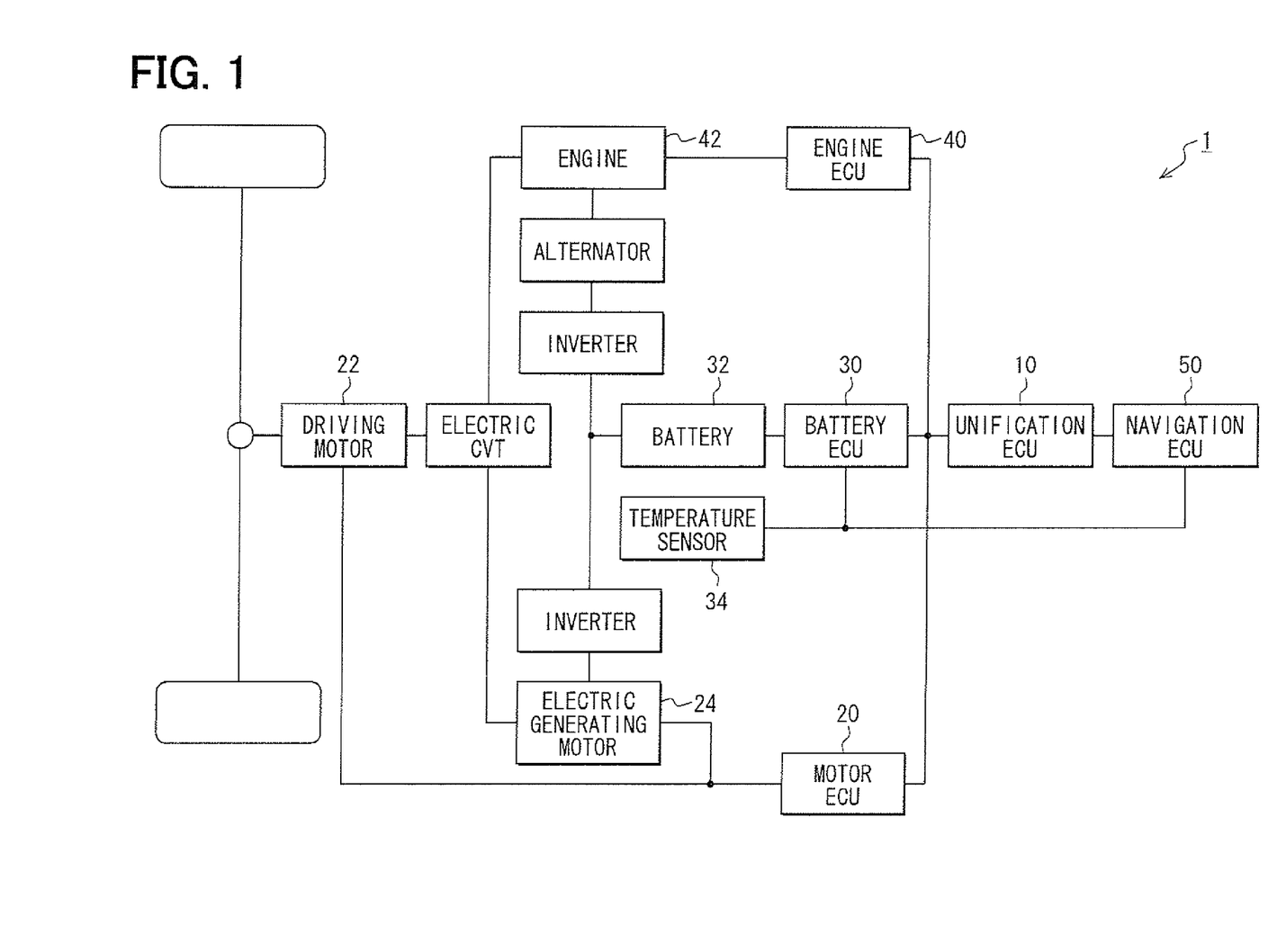
FIG. 1 is a system configuration diagram showing a hybrid vehicle according to an embodiment of the present invention.

In FIG. 1, a system configuration diagram showing a hybrid vehicle according to an embodiment of the present invention is shown. A hybrid vehicle 1 is configured so that use ratios of a motor and an engine are settable and EV running and HEV running are switchable. Therefore, the hybrid vehicle 1 includes a plurality of components.

A unification ECU (electronic control unit) 10 is a section coupled with each of a motor ECU 20, a battery ECU 30, an engine ECU 40, and a navigation ECU 50 so as to be communicatable and unifying functions of these ECUs.

The motor ECU 20 is a section coupled with a driving motor 22 and an electric generating motor 24 and controlling them. The motor ECU 20 controls, for example, timings of starting/stopping and outputs of the motors 22, 24.

The battery ECU 30 is a section coupled with a battery 32 and a temperature sensor 34 and controlling them. The battery ECU 30 detects a remaining battery amount and detects a battery temperature with the temperature sensor 34.

The engine ECU 40 is a section coupled with an engine 42 and comprehensively executing various controls relating to engine such as output control.

The navigation ECU 50 is a section executing a control relating to a car navigation system. The navigation ECU 50 acquires, for example, current location information of a vehicle, running route information to a destination, and traffic jam information and controls the information. The running route information includes at least information about gradients on a route to a destination (for example, classification of a flat road, an uphill road, and a downhill road, angles of the roads, and distances of the roads).

Then, the unification ECU 10, the motor ECU 20, the battery ECU 30, the engine ECU 40, and the navigation ECU 50 described above cooperate as a regenerative charging area detection section, a recovery loss estimation section, and a motor use ratio increase section.

The regenerative charging area detection section detects arrival of a regenerative charging possible area. Mainly, the navigation ECU 50 is used as the regenerative charging area detection section. The regenerative charging possible area is an area in which a regenerative charging from the electric generating motor 24 to the battery 32, such as a downhill road longer than a predetermined distance, and can be previously detected using a known car navigation system.

The recovery loss estimation section is a section that estimates a recovery loss of a regenerative charging based on the regenerative charging amount in the regenerative charging possible area and a current remaining battery amount in response to the detection by the regenerative charging area detection section. Mainly, the battery ECU 30 and the navigation ECU 50 are used as the recovery loss estimation section. More specifically, when the regenerative charging area detection section detects arrival of the regenerative charging possible area, the recovery loss estimation section compares a current battery free amount and a battery amount that is recoverable in the regenerative charging possible area. If the recoverable battery amount is greater than the current battery free amount, the recovery loss estimation section predicts that recovery loss will occur and calculates a recovery loss amount.

The motor use ratio increase section is a section that switches to a running in which a use ratio of the driving motor 22 is increased, such as running (EV running) only with the driving motor 22, before arrival at the regenerative charging possible area in response to estimation by the recovery loss estimation section. Mainly, the motor ECU 20, the battery ECU 30, and the engine ECU 40 are used as the motor use ratio increase section. More specifically, the motor use ratio increase section calculates a battery amount to be consumed and actually consumes the calculated battery amount before arrival at the regenerative charging possible area to recover the recovery loss amount Sm estimated by the recovery loss estimation section.

In addition, the motor use ratio increase section monitors the temperature of the battery 32 with the temperature sensor 34 and increases the use ratio of the driving motor 22 while limiting the battery temperature to a predetermined temperature range. In other words, although the battery temperature increases during the regenerative charging in the regenerative charging possible area, the motor use ratio increasing section controls the use ratios of the driving motor 22 and the engine 42 so that the battery temperature does not reach a predetermined temperature limit.

In a case where the battery amount drastically increases or decreases, the battery 32 generates heat due to, for example, a thermal resistance, and loss of an internal resistance and wirings of the battery 32, and its reliability (mainly lifetime) is reduced. In order to secure the reliability, in a hybrid vehicle under the present circumstance, the above-described temperature limit (an upper limit of temperature under which generation of heat is restricted) is provided. In a battery such as a nickel hydride battery used for a hybrid vehicle, a temperature limit is unique to a battery, and a value is different from each other.

A battery temperature control by the motor use ratio increase section will be described below with the reference to a graph in FIG. 2.

Figure 2:
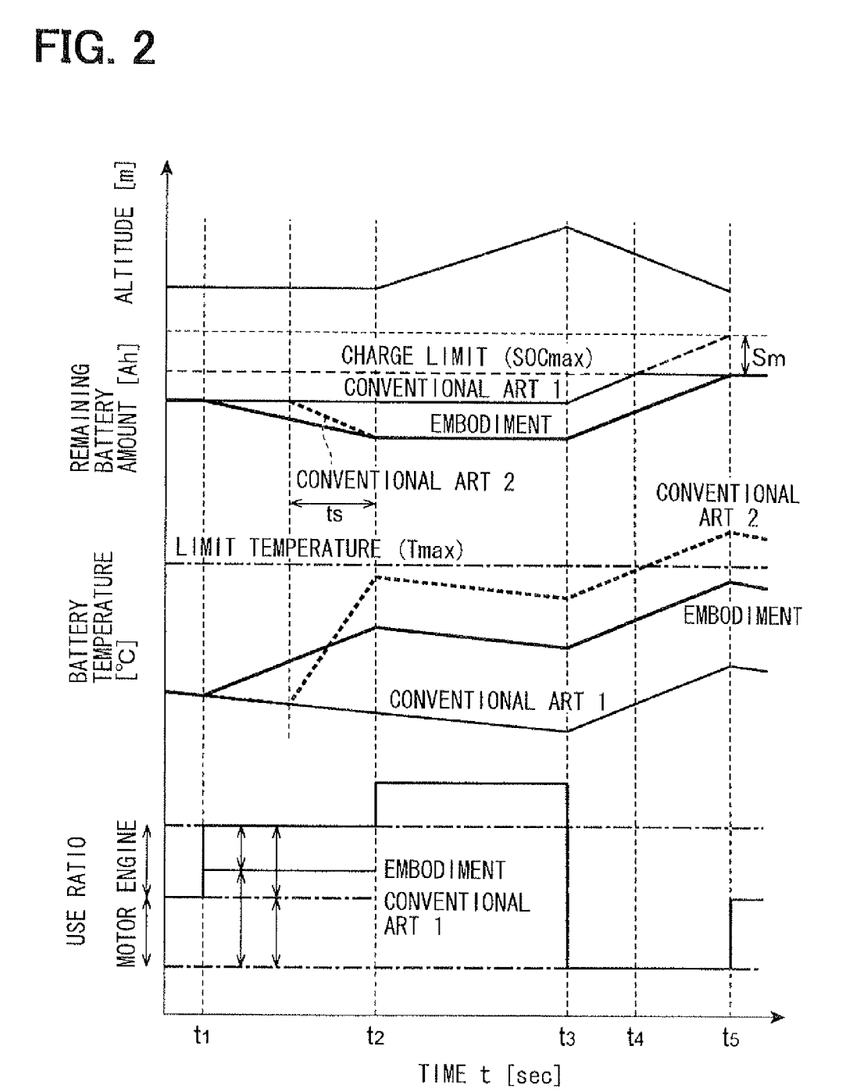
FIG. 2 is a graph showing a battery temperature control in the hybrid vehicle shown in FIG. 1.

FIG. 2 is a graph showing the battery temperature control in the hybrid vehicle 1 and battery temperature controls according to conventional arts. The vertical axis indicates "altitude (m)," "battery charge amount (Ah)," "battery temperature (° C.)," and "use ratios of the driving motor 22 and the engine 42" in order from top, and the horizontal axis indicates time t (sec). The time t of the horizontal axis can also be replaced by a distance L on the assumption that a vehicle speed v is constant.

The altitude on the top of the graph in FIG. 2 shows that the hybrid vehicle 1 runs on a flat road between times t1-t2, an uphill road between times t2-t3, and a downhill road between times t3-t5.

The battery charge amount (SOC) shows that, in a conventional battery charge amount (conventional art 1), a charge amount is constant until a downhill road stating point t3, and a recovery loss Sm of the recovery charging occurs at a downhill ending point t5. In addition, in the present embodiment in which the above-described battery control is performed, a battery charge amount is started to be consumed gradually at running time t1 on the flat road before the uphill road, and battery is consumed (discharged) from a normally maintained amount (i.e., a battery amount at t2 in the conventional art 2) by the same grade as the estimated recovery loss Sm at t2 where the hybrid vehicle 1 arrives at the uphill road. In the present embodiment, the battery charge amount is maintained between t2-t3 on the uphill road, and the recover charging is performed between t3-t5 on the downhill road. Because the battery charge amount corresponding to the recovery loss Sm is consumed on the flat road, the battery charge amount reaches a charge limit (SOCmax) at the downhill ending point t5, and charge loss of the recovery charging does not occur.

The battery temperature shown under it, in the above-described conventional art 1, gradually decreases by natural heat radiation until the recovery charging is started at the downhill starting point t3 and gradually increases between t3-t4 on the uphill road. In a conventional art 2 in which the battery temperature control according to the present embodiment is not performed although the battery charge amount is started to be consumed before arrival at the uphill road, the battery temperature increases too high during the battery consumption on the flat road, and as a result of reaching a battery temperature limit at t4 on the uphill road, the recovery charging of the battery can be forcibly stopped by a safety function. However, in the present embodiment, excess temperature increase can be avoided with estimating a natural radiation amount on the uphill road t2-t3 and a temperature increase amount on the downhill road t3-t4. In order to suppress the excess temperature increase, in the present embodiment, a change of the battery consumption with respect to time is reduced and a change of the battery temperature with respect to time ($\Delta T/\Delta t$) is reduced. In other words, while reducing the use ratio of the driving motor 22, the start of the battery consumption is advanced and the change of the battery temperature with respect time is reduced.

In a case where the battery charge amount drastically increases or decreases, as described above, heat is generated due to the thermal resistance $\theta$ of the battery 32 and loss R of the internal resistance and the wirings of the battery 32. A battery charge and discharge amount Q can be expressed as a left side of the following equation (1) with the battery temperature T (° C.), the thermal resistance $\theta$ (° C./W), the loss R ($\Omega$) of the internal resistance and the wirings of the battery, and time t (sec).

[Formula 1]

$$Q = \sqrt{\frac{T}{\theta \times R}} t \approx \sqrt{\frac{T}{\theta \times R}} \frac{L}{v} \quad (1)$$

When it is assumed that a vehicle runs at a constant speed v (m/sec), the battery charge and discharge amount Q can be expressed as a function of the distance L as the right side of the equation (1). Here, the thermal resistance $\theta$ and the loss R are unique parameters to a device, and the temperature T and the time t are variable parameters. In other words, because the battery charge and discharge amount Q are a function of the temperature T and the time t, when the temperature T is set to the temperature limit Tmax, the battery charge and distance amount Q becomes a function of the time t. Thus, a battery consumption time corresponding to the temperature limit Tmax can be calculated.

As a result, in the present embodiment, the battery temperature does not reach the temperature limit at the downhill road ending point t5, and the recovery charging does not stop during going the downhill.

In the use ratios of the driving motor 22 and the engine 42 at the bottom of the graph, while the use ratios of the driving motor 22 and the engine 42 are maintained and the battery charge amount is maintained constant in the conventional art 1, in the present embodiment, the use ratio of the driving motor 22 is increased at a predetermined time point t1 on the flat road to be a predetermined ratio and is controlled so that the battery charge amount does not reach the charge limit SOCmax and the battery temperature does not reach the temperature limit Tmax. By increasing a motor output and reducing an engine output, the use ratio of the driving motor 22 can be increased.

Figure 3:
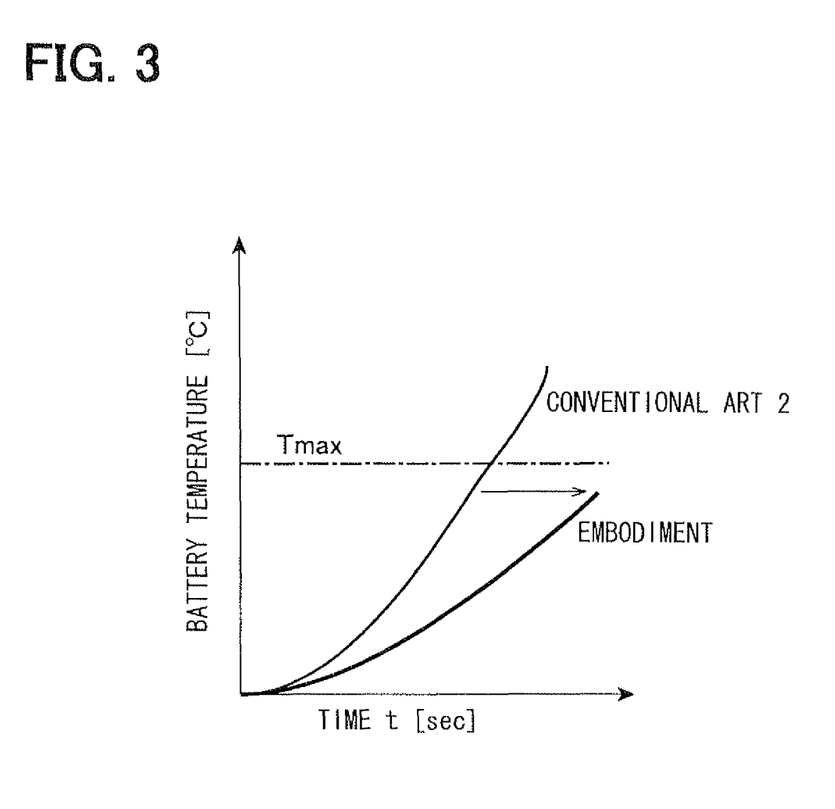
FIG. 3 is a graph showing a change in a battery temperature in a downhill running by the battery temperature control shown in FIG. 2.

An effect of the above-described battery temperature complementary control according to the present embodiment will be described with reference to a graph in FIG. 3. FIG. 3 is a graph showing a degree of increase in the battery temperature from the start of the battery consumption, and a case of the present embodiment and a case of the above-described conventional art 2 are comparatively shown. The present inventors found that even when the consumption of the battery charge amount is started before the downhill road as the conventional art 2, a situation in which the battery temperature reaches the temperature limit (Tmax) of the battery 32 on the downhill road and the regenerative charging can not longer be performed occurs. In contrast, in the present embodiment, as described above, because the motor use ratio increase section increases the use ratio of the driving motor 22 while limiting the battery temperature to the predetermined temperature range, the battery temperature does not reach the temperature limit of the battery until the downhill ending point and the regenerative charging can be recovered without loss.

Thus, in the hybrid vehicle 1 according to the present embodiment, the recovery loss of the regenerative charging can be restricted.

Figure 4:
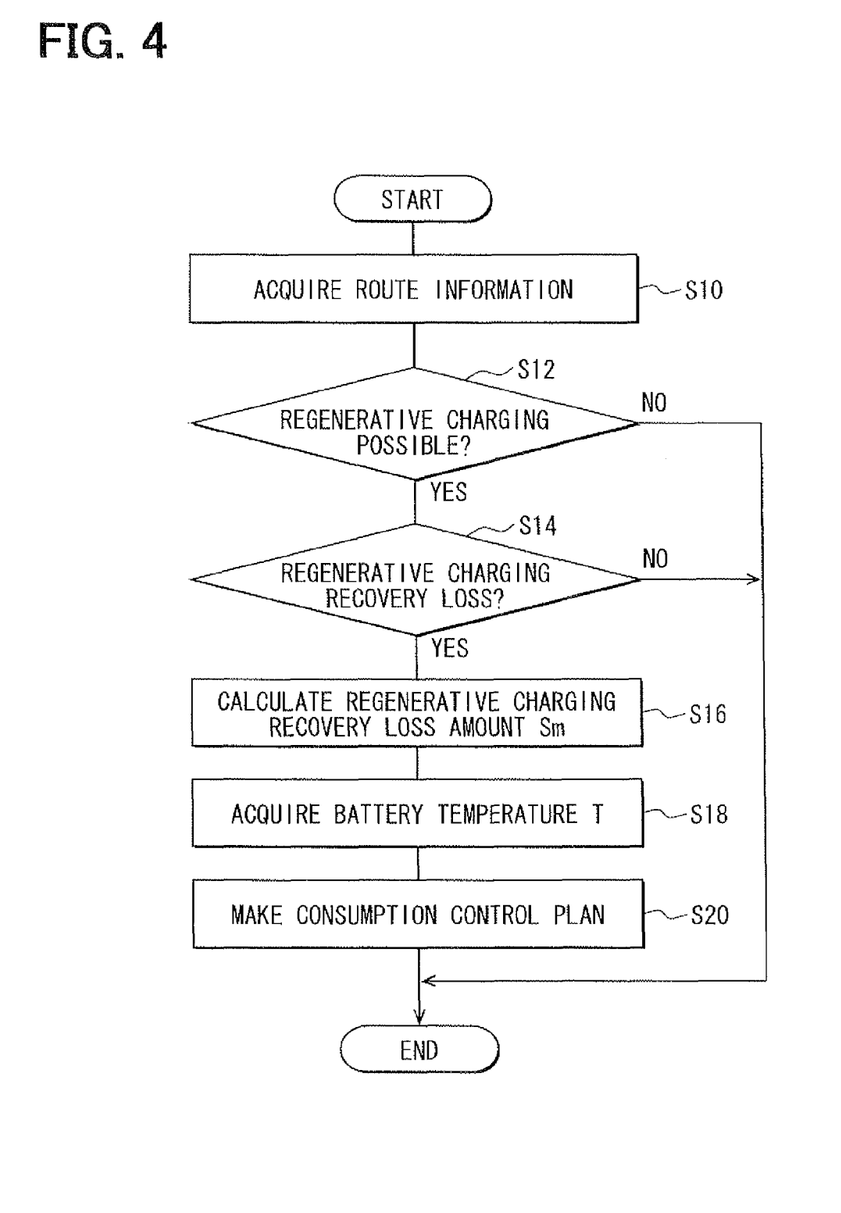
FIG. 4 is a flowchart showing processes for performing the battery temperature control shown in FIG. 2.

FIG. 4 is a flow chart showing processes of performing the battery temperature complementary control in the hybrid vehicle 1.

When the battery temperature complementary control is performed in the hybrid vehicle 1, firstly, the regenerative charging area detection section acquires route information of the vehicle using the navigation ECU 50 (S10) and determines arrival of a regenerative charging possible area (S12). In a case where there is no regenerative charging possible area, a conventional battery control is selected.

Next, the regenerative charging area detection section determines a recovery loss of the regenerative charging based on the regenerative charging amount and a current battery charge amount (S14) and calculates the recovery loss amount Sm when the recovery loss is estimated (S16).

After that, the motor use ratio increase section detects the battery temperature from the temperature sensor (S18), makes a battery consumption control plan for limiting the battery temperature to the predetermined temperature range, and controls an increasing amount and an increasing timing of the use ratio of the driving motor 22 in accordance with the plan (S20). In addition, the recovery loss amount Sm at S16 corresponds to the battery charge and discharge amount Q in the equation (1), and the battery temperature at S18 corresponds to the temperature limit Tmax in the equation (1).

As described above, in the hybrid vehicle 1, when the regenerative charging area detection section detects arrival of a regenerative charging possible area and when the recovery loss estimation section estimates a recovery loss of a regenerative charging, the motor use ratio increase section increases the use ratio of the driving motor 22 before the arrival of the regenerative charging possible area. At that time, the motor use ratio increase section increases the use ratio of the driving motor 22 while limiting the battery temperature to the temperature limit (the predetermined temperature range), a situation that the battery temperature exceeds the temperature limit can be effectively restricted. Thus, a situation that the charging cannot be performed after the battery 32 exceeds the temperature limit is avoided, and the recovery loss of the regenerative charging in the regenerative charging possible area can be restricted. As a result, improvement of fuel consumption can be achieved.

In the above-described embodiments, as shown in the altitude of the graph in FIG. 2, an embodiment in which the motor use ratio increase section increases the use ratio of the driving motor 22 before arrival of an uphill road in a case where there is the uphill road (the motor running inappropriate area that is not appropriate for running with the driving motor 22) before a downhill road (regenerative charging possible area) is described. In a case were the motor running appropriate area in which a driving force by running with the driving motor 22 is not sufficient is located before the regenerative charging possible area, the use ratio of the driving motor 22 is increased before the motor running inappropriate area with avoiding the motor running inappropriate area. Accordingly, the battery charge amount can be appropriately consumed without making a driver feel uncomfortable. However, it is needless to say that the above-described battery temperature complementary control can also be applied to an embodiment in which there is no uphill road before a downhill road.

In addition, the unification ECU 10, the motor ECU 20, the battery ECU 30, the engine ECU 40, and the navigation ECU 50 described above can cooperate as a battery temperature estimation section that estimates the temperature of the battery 32 in accordance with a road condition to a destination and a control section that sets the use ratios of the driving motor 22 and the engine 42 in accordance with the temperature of the battery 32. Also in this case, the hybrid vehicle 1 can restrict an increase in the battery temperature and can restrict a recovery loss of a regenerative charging.

The invention claimed is:

1. A hybrid vehicle comprising:
a battery temperature estimator configured to estimate a temperature of a battery in accordance with a road condition to a destination;
a controller configured to use ratios of a motor and an engine in accordance with the temperature of the battery;
a regenerative charging area detector configured to detect arrival of a regenerative charging possible area in which a regenerative charging from the motor to the battery is possible;
a recovery loss estimator configured to estimate a recovery loss of the regenerative charging based on a regenerative charging amount in the regenerative charging possible area and a current remaining battery amount in response to detection by the regenerative charging area detector; and
a motor use ratio increase controller configured to increase the use ratio of the motor so as to decrease a remaining battery amount before the arrival at the regenerative charging possible area in response to estimation by the recovery loss estimator,
wherein the motor ratio increase controller increases the use ratio of the motor while limiting the temperature of the battery to a predetermined temperature range.

2. The hybrid vehicle according to claim 1,
wherein when a motor running inappropriate area which is not appropriate to a running with the motor is located before the regenerative charging possible area, the motor ratio increase controller increases the use ratio of the motor before arrival at the motor running inappropriate area.

3. A hybrid vehicle comprising:
a regenerative charging area detector configured to detect arrival of a regenerative charging possible area in which a regenerative charging from the motor to the battery is possible;
a recovery loss estimator configured to estimate a recovery loss of the regenerative charging based on a regenerative charging amount in the regenerative charging possible area and a current remaining battery amount in response to detection by the regenerative charging area detector; and
a motor use ratio increase controller configured to increase a use ratio of the motor so as to decrease a remaining battery amount before the arrival at the regenerative charging possible area in response to estimation by the recovery loss estimator,
wherein the motor ratio increase controller increases the use ratio of the motor while limiting a temperature of the battery to a predetermined temperature range.

4. The hybrid vehicle according to claim 3,
wherein when a motor running inappropriate area which is not appropriate to a running with the motor is located before the regenerative charging possible area, the motor ratio increase controller increases the use ratio of the motor before arrival at the motor running inappropriate area.

* * * * *